United States Patent
Struhsaker (10) Patent No.: US 9,426,794 B2
(45) Date of Patent: Aug. 23, 2016

(54) WIRELESS COMMUNICATION SYSTEM AND DEVICE FOR COUPLING A BASE STATION AND MOBILE STATIONS

(75) Inventor: Paul F. Struhsaker, Plano, TX (US)

(73) Assignee: Access Solutions, Ltd., Dallas, TX (US)

( * ) Notice: Subject to any disclaimer, the term of this patent is extended or adjusted under 35 U.S.C. 154(b) by 64 days.

(21) Appl. No.: 13/488,374

(22) Filed: Jun. 4, 2012

(65) Prior Publication Data

US 2012/0307815 A1 Dec. 6, 2012
US 2016/0037489 A9 Feb. 4, 2016

Related U.S. Application Data (63) Continuation of application No. 11/982,424, filed on Oct. 31, 2007, now abandoned, which is a continuation of application No. 09/839,499, filed on Apr. 20, 2001, now Pat. No. 7,346,347.

(Continued)

(51) Int. Cl.
| | |
|---|---|
| *H04W 36/00* | (2009.01) |
| *H04W 72/04* | (2009.01) |
| *H04W 84/14* | (2009.01) |

(Continued)

(52) U.S. Cl.
CPC ........... *H04W 72/042* (2013.01); *H04W 84/14* (2013.01); *H04W 84/12* (2013.01); *H04W 88/02* (2013.01); *H04W 88/08* (2013.01)

(58) Field of Classification Search
CPC .. H04W 84/045; H04W 84/14; H04W 84/12

USPC ........................................................ 455/443
See application file for complete search history.

(56) References Cited

U.S. PATENT DOCUMENTS

| | | |
|---|---|---|
| 4,797,898 A | 1/1989 | Martinez |
| 5,115,463 A | 5/1992 | Moldavsky et al. |

(Continued)

FOREIGN PATENT DOCUMENTS

| | | |
|---|---|---|
| EP | 0444841 | 12/1899 |
| EP | 0304955 | 3/1989 |

(Continued)

OTHER PUBLICATIONS

Bellamy, J., "Digital Telephony", 2nd Edition, John Wiley and Sons, 1990.

(Continued)

*Primary Examiner* — Wayne Cai
(74) *Attorney, Agent, or Firm* — Byrne Poh LLP (57) ABSTRACT

A wireless communication system comprising first and second transceivers. The first transceiver communicate with a base station, wherein the base station communicates with the first transceiver and a plurality of other wireless communication devices according to a wide area wireless communication protocol. The second transceiver is coupled to the first transceiver and communicates with a first mobile station, wherein the second transceiver communicates with the first mobile station according to a local area wireless communication protocol. The first transceiver receives from the base station a first downlink signal intended for the first mobile station and transmits the first downlink signal to the second transceiver. The second transceiver re-transmits the first downlink signal to the first mobile station as a second downlink signal according to the local area wireless communication protocol.

6 Claims, 3 Drawing Sheets

Related U.S. Application Data (60) Provisional application No. 60/262,712, filed on Jan. 19, 2001, provisional application No. 60/262,825, filed on Jan. 19, 2001, provisional application No. 60/262,698, filed on Jan. 19, 2001, provisional application No. 60/262,827, filed on Jan. 19, 2001, provisional application No. 60/262,826, filed on Jan. 19, 2001, provisional application No. 60/262,951, filed on Jan. 19, 2001, provisional application No. 60/262,824, filed on Jan. 19, 2001, provisional application No. 60/263,101, filed on Jan. 19, 2001, provisional application No. 60/263,097, filed on Jan. 19, 2001, provisional application No. 60/273,579, filed on Mar. 5, 2001, provisional application No. 60/262,955, filed on Jan. 19, 2001, provisional application No. 60/273,689, filed on Mar. 5, 2001, provisional application No. 60/273,757, filed on Mar. 5, 2001, provisional application No. 60/270,378, filed on Feb. 1, 2001, provisional application No. 60/270,385, filed on Feb. 21, 2001, provisional application No. 60/270,430, filed on Feb. 21, 2001, provisional application No. 60/262,708, filed on Jan. 19, 2001.

(51) Int. Cl.
| | |
|---|---|
| H04W 4/00 | (2009.01) |
| H04W 40/00 | (2009.01) |
| H04B 1/56 | (2006.01) |
| H04L 12/56 | (2006.01) |
| H04W 84/12 | (2009.01) |
| H04W 88/02 | (2009.01) |
| H04W 88/08 | (2009.01) |

(56) References Cited

U.S. PATENT DOCUMENTS

| | | |
|---|---|---|
| 5,416,831 A | 5/1995 | Chewning et al. |
| 5,475,735 A | 12/1995 | Williams et al. |
| 5,490,252 A | 2/1996 | Macera et al. |
| 5,603,095 A | 2/1997 | Uola |
| 5,604,789 A | 2/1997 | Lerman |
| 5,625,623 A | 4/1997 | Kent et al. |
| 5,638,371 A | 6/1997 | Raychaudhuri et al. |
| 5,659,605 A | 8/1997 | Voit et al. |
| 5,673,307 A | 9/1997 | Holland et al. |
| 5,684,791 A | 11/1997 | Raychaudhuri et al. |
| 5,694,424 A | 12/1997 | Ariyavisitakul |
| 5,732,076 A | 3/1998 | Ketseoglou et al. |
| 5,745,837 A | 4/1998 | Fuhrmann |
| 5,745,841 A | 4/1998 | Reudink et al. |
| 5,790,936 A | 8/1998 | Dinkins |
| 5,809,086 A | 9/1998 | Ariyavisitakul |
| 5,884,148 A | 3/1999 | Bilgic et al. |
| 5,901,352 A | 5/1999 | St-Pierre et al. |
| 5,915,215 A | 6/1999 | Williams et al. |
| 5,933,776 A | 8/1999 | Kirkpatrick |
| 5,991,292 A | 11/1999 | Focsaneanu et al. |
| 5,995,851 A | 11/1999 | Lim |
| 5,999,818 A | 12/1999 | Gilbert et al. |
| 6,014,546 A | 1/2000 | Georges et al. |
| 6,016,311 A | 1/2000 | Gilbert et al. |
| 6,023,459 A | 2/2000 | Clark et al. |
| 6,023,462 A | 2/2000 | Nieczyporowicz et al. |
| 6,035,178 A | 3/2000 | Chennakeshu et al. |
| 6,052,408 A | 4/2000 | Struhsaker et al. |
| 6,097,968 A | 8/2000 | Bannister et al. |
| 6,115,367 A | 9/2000 | Archambaud et al. |
| 6,150,955 A | 11/2000 | Tracy et al. |
| 6,163,698 A | 12/2000 | Leitch et al. |
| 6,185,412 B1 | 2/2001 | Pentikainen et al. |
| 6,188,873 B1 | 2/2001 | Wickman et al. |
| 6,192,248 B1 | 2/2001 | Solondz |
| 6,208,871 B1 | 3/2001 | Hall et al. |
| 6,222,503 B1 | 4/2001 | Gietema et al. |
| 6,226,274 B1 | 5/2001 | Reese et al. |
| 6,289,213 B1 | 9/2001 | Flint et al. |
| 6,324,384 B1 | 11/2001 | Nobuyasu et al. |
| 6,363,252 B1 | 3/2002 | Hamalainen et al. |
| 6,374,078 B1 * | 4/2002 | Williams et al. ............ 455/7 |
| 6,377,800 B1 | 4/2002 | Cho |
| 6,378,119 B1 | 4/2002 | Raves |
| 6,421,329 B1 | 7/2002 | Kikinis |
| 6,526,290 B1 | 2/2003 | Yla-Mella et al. |
| 6,560,213 B1 | 5/2003 | Izadpanah et al. |
| 6,564,051 B2 | 5/2003 | Struhsaker et al. |
| 6,587,444 B1 | 7/2003 | Lenzo et al. |
| 6,600,914 B2 | 7/2003 | Uhlik et al. |
| 6,611,507 B1 | 8/2003 | Hottinen et al. |
| 6,654,605 B1 | 11/2003 | Seo |
| 6,697,606 B1 | 2/2004 | Wagemans et al. |
| 6,792,286 B1 | 9/2004 | Bharath et al. |
| 6,804,527 B2 | 10/2004 | Struhsaker et al. |
| 6,836,546 B1 | 12/2004 | Willer |
| 6,839,333 B1 | 1/2005 | Akerberg |
| 6,839,334 B1 | 1/2005 | Krishnamoorthy et al. |
| 6,859,655 B2 | 2/2005 | Struhsaker |
| 6,891,810 B2 | 5/2005 | Struhsaker et al. |
| 6,925,072 B1 | 8/2005 | Grohn |
| 6,925,516 B2 | 8/2005 | Struhsaker et al. |
| 6,947,477 B2 | 9/2005 | Struhsaker et al. |
| 6,954,432 B1 | 10/2005 | Bychowsky et al. |
| 7,002,929 B2 | 2/2006 | Struhsaker et al. |
| 7,010,023 B1 | 3/2006 | Sato |
| 7,031,738 B2 | 4/2006 | Struhsaker |
| 7,035,241 B2 | 4/2006 | Struhsaker |
| 7,061,886 B1 | 6/2006 | Moon et al. |
| 7,065,098 B2 | 6/2006 | Struhsaker et al. |
| 7,069,047 B2 | 6/2006 | Struhsaker et al. |
| 7,075,967 B2 | 7/2006 | Struhsaker et al. |
| 7,099,339 B1 | 8/2006 | Wang et al. |
| 7,099,383 B2 | 8/2006 | Struhsaker et al. |
| 7,173,916 B2 | 2/2007 | Struhsaker et al. |
| 7,218,890 B1 | 5/2007 | Iseli et al. |
| 7,230,931 B2 | 6/2007 | Struhsaker |
| 7,239,618 B1 | 7/2007 | La Porta et al. |
| 7,274,946 B2 | 9/2007 | Struhsaker |
| 7,292,844 B2 | 11/2007 | Dowling et al. |
| 7,606,189 B1 | 10/2009 | Lee et al. |
| 7,764,228 B2 | 7/2010 | Durst et al. |
| 8,018,907 B2 | 9/2011 | Kubler et al. |
| 2001/0004595 A1 | 6/2001 | Dent |
| 2001/0033561 A1 | 10/2001 | Rodin |
| 2001/0041569 A1 | 11/2001 | Rahman |
| 2001/0046859 A1 | 11/2001 | Kil |
| 2002/0058513 A1 | 5/2002 | Klein et al. |
| 2002/0065063 A1 | 5/2002 | Uhlik et al. |
| 2002/0097694 A1 | 7/2002 | Struhsaker |
| 2002/0098799 A1 | 7/2002 | Struhsaker et al. |
| 2002/0098858 A1 | 7/2002 | Struhsaker |
| 2002/0141355 A1 | 10/2002 | Struhsaker et al. |
| 2002/0152053 A1 | 10/2002 | Roy et al. |
| 2002/0164991 A1 | 11/2002 | Arazi et al. |
| 2002/0171581 A1 | 11/2002 | Sheynblat et al. |
| 2004/0213188 A1 | 10/2004 | Struhsaker et al. |
| 2005/0048985 A1 | 3/2005 | Haartsen |
| 2005/0243745 A1 | 11/2005 | Stanwood et al. |
| 2006/0233161 A1 | 10/2006 | Koenck et al. |
| 2012/0147797 A1 | 6/2012 | Furuskar et al. |

FOREIGN PATENT DOCUMENTS

| | | |
|---|---|---|
| EP | 0690637 | * 1/1996 |
| EP | 0690638 | 1/1996 |
| WO | WO/97/041699 | 11/1997 |
| WO | WO/98/24254 | 6/1998 |
| WO | WO/99/09762 | 2/1999 |
| WO | WO/99/26437 | 5/1999 |
| WO | WO/99/27720 | 6/1999 |
| WO | WO/99/29126 | 6/1999 |

(56) References Cited

FOREIGN PATENT DOCUMENTS

| WO | WO/99/37059 | 7/1999 |
|----|-------------|--------|
| WO | WO/99/51043 | 10/1999 |
| WO | WO/01/56233 | 8/2001 |

OTHER PUBLICATIONS

European Telecommunications Standards Institute, "Broadband Radio Access Networks, Inventory of Broadband Radio Technologies and Techniques", ETSI TR 101 173 V1.1, May 1998, chapter 7, pp. 29-38.
Goodman, D. J. et. al., "Packet Reservation Multiple Access for Local Wireless Communications", In IEEE Transactions on Communications, vol. 37, No. 8, Aug. 1989, pp. 885-890.
Kubbar, O. and Mouftah, H.T., "Multiple Access Control Protocols for Wireless ATM: Problems Definition and Design Objectives", In IEEE Comunication Magazine, vol. 35, No. 11, Nov. 1997, pp. 93-99.
Office Action dated May 4, 2011 in U.S. Appl. No. 11/982,424.
Office Action dated May 23, 2011 in U.S. Appl. No. 11/982,404.
Office Action dated Jun. 14, 2013 in U.S. Appl. No. 13/532,650.
Office Action dated Jun. 27, 2011 in U.S. Appl. No. 11/982,459.
Office Action dated Jul. 6, 2011 in U.S. Appl. No. 11/982,458.
Office Action dated Sep. 2, 2010 in U.S. Appl. No. 11/982,404.
Office Action dated Sep. 16, 2010 in U.S. Appl. No. 11/982,461.
Office Action dated Sep. 25, 2012 in U.S. Appl. No. 13/532,650.
Office Action dated Sep. 29, 2010 in U.S. Appl. No. 11/982,424.
Office Action dated Sep. 29, 2010 in U.S. Appl. No. 11/982,459.
Office Action dated Oct. 13, 2010 in U.S. Appl. No. 11/982,458.
Office Action dated Oct. 29, 2010 in U.S. Appl. No. 11/982,463.
Office Action dated May 7, 2004 in U.S. Appl. No. 09/839,499.
Office Action dated Jul. 21, 2006 in U.S. Appl. No. 09/839,499.
Rappaport, T., "Wireless Communications, Principles and Practice", IEEE Press, 1996, chapter 8, pp. 395-436.
Roman, V.I., "Frequency Reuse and System Deployment in Local Multipoint Distibution Service," IEEE Personal Communications, Dec. 1999, pp. 20-27.
Sklar, B., "Digital Communications Fundamentals and Applications", Prentice Hall, 1988, chapter 9, pp. 520-597.
Notice of Allowance dated Sep. 30, 2014 in U.S. Appl. No. 13/567,978.
Office Action dated Jul. 1, 2013 in U.S. Appl. No. 13/488,374.
Office Action dated Sep. 24, 2014 in U.S. Appl. No. 13/532,650.
Office Action dated Oct. 17, 2012 in U.S. Appl. No. 13/488,374.
Notice of Allowance dated Jun. 10, 2014 in U.S. Appl. No. 13/532,650.
Office Action dated Feb. 18, 2015 in U.S. Appl. No. 14/595,208.
Office Action dated Oct. 13, 2010 in U.S. Appl. No. 11/903,508.
Office Action dated Oct. 15, 2015 in U.S. Appl. No. 14/595,208.
Povey, G.J. et al., "TDD-CDMA Extension to FDD-CDMA Based Third Generation Cellular System," In Proceedings of IEEE 6th International Conference on Universal Personal Communications Record, San Diego, CA, US, Oct. 12-16, 1997, vol. 2, pp. 813-817.
U.S. Appl. No. 11/903,508, filed Sep. 21, 2007.
Notice of Allowance dated Feb. 26, 2016 in U.S. Appl. No. 14/595,208.

* cited by examiner

WIRELESS COMMUNICATION SYSTEM AND DEVICE FOR COUPLING A BASE STATION AND MOBILE STATIONS

CROSS-REFERENCE TO RELATED APPLICATIONS

This application is a continuation of prior U.S. patent application Ser. No. 11/982,424 filed on Oct. 31, 2007 now abandoned, which claims priority to: U.S. patent application Ser. No. 09/839,499 filed on Apr. 20, 2001, now U.S. Pat. No. 7,346,347. U.S. patent application Ser. No. 09/839,499 claims priority to provisional U.S. Patent Application Ser. No. 60/262,708 filed on Jan. 19, 2011; U.S. patent application Ser. No. 09/713,684 filed on Nov. 15, 2000; provisional U.S. Patent Application Ser. No. 60/262,712 filed on Jan. 19, 2001 and entitled "WIRELESS COMMUNICATION SYSTEM USING BLOCK FILTERING AND FAST EQUALIZATION-DEMODULATION AND METHOD OF OPERATION"; provisional U.S. Patent Application Ser. No. 60/262,825 filed on Jan. 19, 2001 and entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM"; provisional U.S. Patent Application Ser. No. 60/262,698 filed on Jan. 19, 2001 and entitled "APPARATUS AND METHOD FOR OPERATING A SUBSCRIBER INTERFACE IN A FIXED WIRELESS SYSTEM"; provisional U.S. Patent Application Ser. No. 60/262,827 filed on Jan. 19, 2001 entitled "APPARATUS AND METHOD FOR CREATING SIGNAL AND PROFILES AT A RECEIVING STATION"; provisional U.S. Patent Application Ser. No. 60/262,826 filed on Jan. 19, 2001 and entitled "SYSTEM AND METHOD FOR INTERFACE BETWEEN A SUBSCRIBER MODEM AND SUBSCRIBER PREMISES INTERFACES"; provisional U.S. Patent Application Ser. No. 60/262,951 filed on Jan. 19, 2001 entitled "BACKPLANE ARCHITECTURE FOR USE IN WIRELESS AND WIRELINE ACCESS SYSTEMS"; provisional U.S. Patent Application Ser. No. 60/262,824 filed on Jan. 19, 2001 entitled "SYSTEM AND METHOD FOR ON-LINE INSERTION OF LINE REPLACEABLE UNITS IN WIRELESS AND WIRELINE ACCESS SYSTEMS"; provisional U.S. Patent Application Ser. No. 60/263,101 filed on Jan. 19, 2001 entitled "SYSTEM FOR COORDINATION OF TDD TRANSMISSION BURSTS WITHIN AND BETWEEN CELLS IN A WIRELESS ACCESS SYSTEM AND METHOD OF OPERATION"; provisional U.S. Patent Application Ser. No. 60/263,097 filed on Jan. 19, 2001 and entitled "REDUNDANT TELECOMMUNICATION SYSTEM USING MEMORY EQUALIZATION APPARATUS AND METHOD OF OPERATION"; provisional U.S. Patent Application Ser. No. 60/273,579 filed Mar. 5, 2001 and entitled "WIRELESS ACCESS SYSTEM FOR ALLOCATING AND SYNCHRONIZING UPLINK AND DOWNLINK OF TDD FRAMES AND METHOD OF OPERATION"; provisional U.S. Patent Application Ser. No. 60/262,955 filed Jan. 19, 2001 and entitled "TDD FDD AIR INTERFACE"; provisional U.S. Patent Application Ser. No. 60/273,689 filed on Mar. 5, 2001 and entitled "WIRELESS ACCESS SYSTEM USING MULTIPLE MODULATION FORMATS IN TDD FRAMES AND METHOD OF OPERATION"; provisional U.S. Patent Application Ser. No. 60/273,757 filed Mar. 5, 2001 and entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE"; provisional U.S. Patent Application Ser. No. 60/270,378 filed Feb. 21, 2001 and entitled "APPARATUS FOR ESTABLISHING A PRIORITY CALL IN A FIXED WIRELESS ACCESS COMMUNICATION SYSTEM"; provisional U.S. Patent Application Ser. No. 60/270,385 filed Feb. 21, 2001 and entitled "APPARATUS FOR REALLOCATING COMMUNICATION RESOURCE TO ESTABLISH A PRIORITY CALL IN A FIXED WIRELESS ACCESS COMMUNICATION SYSTEM"; and provisional U.S. Patent Application Ser. No. 60/270,430 filed Feb. 21, 2001 and entitled "METHOD FOR ESTABLISHING A PRIORITY CALL IN A FIXED WIRELESS ACCESS COMMUNICATION SYSTEM. Each of these applications and/or patents are hereby incorporated by reference herein in their entireties.

In addition, the subject matter disclosed in the present application is related to that disclosed in the following United States Patent Applications:

1) Ser. No. 09/713,684 filed on Nov. 15, 2000 and entitled "SUBSCRIBER INTEGRATED ACCESS DEVICE FOR USE IN WIRELESS AND WIRELINE ACCESS SYSTEMS";
2) Ser. No. 09/838,810 filed Apr. 20, 2001 and entitled "WIRELESS COMMUNICATION SYSTEM USING BLOCK FILTERING AND FAST EQUALIZATION-DEMODULATION AND METHOD OF OPERATION", now U.S. Pat. No. 7,075,967;
3) Ser. No. 09/839,726 filed Apr. 20, 2001 and entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM", now U.S. Pat. No. 7,099,383;
4) Ser. No. 09/839,729 filed Apr. 20, 2001 and entitled "APPARATUS AND METHOD FOR OPERATING A SUBSCRIBER INTERFACE IN A FIXED WIRELESS SYSTEM", abandoned;
5) Ser. No. 09/839,719 filed Apr. 20, 2001 and entitled "APPARATUS AND METHOD FOR CREATING SIGNAL AND PROFILES AT A RECEIVING STATION", now U.S. Pat. No. 6,947,477;
6) Ser. No. 09/838,910 filed Apr. 20, 2001 and entitled "SYSTEM AND METHOD FOR INTERFACE BETWEEN A SUBSCRIBER MODEM AND SUBSCRIBER PREMISES INTERFACES", now U.S. Pat. No. 6,564,051;
7) Ser. No. 09/839,509 filed Apr. 20, 2001 and entitled "BACKPLANE ARCHITECTURE FOR USE IN WIRELESS AND WIRELINE ACCESS SYSTEMS", abandoned;
8) Ser. No. 09/839,514 filed Apr. 20, 2001 and entitled "SYSTEM AND METHOD FOR ON-LINE INSERTION OF LINE REPLACEABLE UNITS IN WIRELESS AND WIRELINE ACCESS SYSTEMS", now U.S. Pat. No. 7,069,047;
9) Ser. No. 09/839,512 filed Apr. 20, 2001 and entitled "SYSTEM FOR COORDINATION OF TDD TRANSMISSION BURSTS WITHIN AND BETWEEN CELLS IN A WIRELESS ACCESS SYSTEM AND METHOD OF OPERATION", now U.S. Pat. No. 6,804,527;
10) Ser. No. 09/839,259 filed Apr. 20, 2001 and entitled "REDUNDANT TELECOMMUNICATION SYSTEM USING MEMORY EQUALIZATION APPARATUS AND METHOD OF OPERATION", now U.S. Pat. No. 7,065,098;
11) Ser. No. 09/839,457 filed Apr. 20, 2001 and entitled "WIRELESS ACCESS SYSTEM FOR ALLOCATING AND SYNCHRONIZING UPLINK AND DOWNLINK OF TDD FRAMES AND METHOD OF OPERATION", now U.S. Pat. No. 7,002,929;

12) Ser. No. 09/839,075 filed Apr. 20, 2001 and entitled "TDD FDD AIR INTERFACE", now U.S. Pat. No. 6,859,655;

13) Ser. No. 09/839,458 filed Apr. 20, 2001 and entitled "WIRELESS ACCESS SYSTEM USING MULTIPLE MODULATION", now U.S. Pat. No. 7,173,916;

14) Ser. No. 09/839,456 filed Apr. 20, 2011 and entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE", now U.S. Pat. No. 6,891,810;

15) Ser. No. 09/838,924 filed Apr. 20, 2001 and entitled "APPARATUS FOR ESTABLISHING A PRIORITY CALL IN A FIXED WIRELESS ACCESS COMMUNICATION SYSTEM", now U.S. Pat. No. 7,274,946;

16) Ser. No. 09/839,727 filed Apr. 20, 2001 and entitled "APPARATUS FOR REALLOCATING COMMUNICATION RESOURCES TO ESTABLISH A PRIORITY CALL IN A FIXED WIRELESS ACCESS COMMUNICATION SYSTEM", now U.S. Pat. No. 7,031,738;

17) Ser. No. 09/839,734 filed Apr. 20, 2001 and entitled "METHOD FOR ESTABLISHING A PRIORITY CALL IN A FIXED WIRELESS ACCESS COMMUNICATION SYSTEM", now U.S. Pat. No. 7,035,241; and 18) Ser. No. 09/839,513 filed Apr. 20, 2001 and entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS", now U.S. Pat. No. 6,925,516.

The above applications are commonly assigned to the assignee of the present application. The disclosures of these related patent applications may share common subject matter and figures and are hereby incorporated by reference herein in their entireties.

The present invention relates generally to a manner by which to provide mobile communications in a fixed wireless access (FWA) communication system. More particularly, the present invention relates to apparatus, and an associated method, for providing WLAN (wireless local area network) service at a subscriber station of the fixed wireless access communication system. Mobile stations operation in the WLAN are thereby able to communicate in the WLAN coverage area encompassing the subscriber station. When WLAN service is provided to a plurality of fixed-site subscriber stations, cellular coverage areas are formed, between which handover of communications are permitted all by way of the fixed wireless access communication system.

BACKGROUND OF THE INVENTION

Advancements in communication technologies have permitted the development, and implementation, of new types of communication systems. Such communication systems are able to permit the communication of increased amounts of data at increased thruput rates relative to conventional communication systems. And, such new communication systems have permitted communication of information at, and between, communication stations positioned at locations from which communications have conventionally been inconvenient or impractical.

Radio communication systems, for instance, are exemplarily of communication systems of which new types, and improvements to existing types, have been made possible as a result of advancements in communication technologies. Similar to other types of communication systems, in a radio communication system, information is communicated between a sending station and a receiving station by way of a communication channel. In a radio communication system, unlike other types of communication systems, a communication channel formed between the sending and the receiving stations and upon which information is communicated by the sending station to the receiving station, is formed of a portion of the electromagnetic spectrum. Radio links are defined upon the portion of the electromagnetic spectrum allocated to the radio communication system.

Because a radio link is utilized upon which to form communication channels, a fixed, or wireline, connection is not required to be formed between the sending and receiving stations to form a communication channel. Information can be communicated between the sending and receiving stations at, and between, locations at which conventional wireline communications would not be permitted. Additionally, the infrastructure costs associated with the installation of a radio communication system are also generally lower than the corresponding costs which would be required to install a conventional, wireline communication system. And, as the advancements in communication technologies have permitted the bandwidth allocated to a radio communication system to be utilized more efficiently, a radio communication can increasingly be utilized effectuate a communication service which require relatively significant data thruput capability.

A wireless broadband communication system has been proposed, for instance, by which to permit the effectuation of any of various communication services by way of radio links with fixed-site subscriber stations. Radio links are formed with the subscriber stations by fixed-site base stations. The base stations are installed at spaced-apart locations throughout the geographical area which is to be encompassed by the wireless broadband communication system. Several subscriber stations are capable of communicating with a single base station.

Communication of data is effectuated between the subscriber stations and an associated base station by way of radio links upon which communication channels are defined. Because radio links are utilized between the subscriber stations and the base stations, the infrastructure costs associated with the formation of wireline connections between the subscriber stations are obviated. Broadband communications, and communication services which require the communication of broadband data, as well as communication services necessitating smaller data thruput rates are effectuable through use of the wireless broadband communication system.

Advancements in communication technologies have also permitted the development, and introduction, of other types of radio communication systems. Wireless communication systems, sometimes referred to as micro-cellular networks, private networks, and WLANs (wireless local area networks) are exemplary of such systems. Such networks, generally, provide for radio communications with mobile stations positioned within communication range of such networks.

Generally, the communication ranges of the mobile stations operable in such systems is relatively small as relatively low-power signals are originated at the mobile stations and, correspondingly, originated at the network infrastructure of such systems to be terminated at the mobile stations. The network infrastructure of such systems typically include fixed-location transceivers, sometimes referred to as access points. The access points are capable of communicating with a group of mobile stations positioned within a micro-cellular, or other, area defined by the access point. In some of such systems, the access points are coupled to a conventional, local area network, also used to interconnect the processing stations of an office computer system. In other such systems, the access points are connected in other manners.

Installation of a wireless broadband communication system to provide broadband services with a plurality of subscriber stations provides a radio infrastructure throughout a geographical area throughout which wireless broadband communication services are effectuable. If a manner could be provided by which to utilize the communication capabilities of a wireless broadband communication system to provide additional communication services, additional benefits of a wireless broadband communication system would be provided.

It is in light of this background information related to radio communication systems that the significant improvements of the present invention have evolved.

SUMMARY OF THE INVENTION

The present invention, accordingly, advantageously provides apparatus, and an associated method, by which to provide mobile communications in a fixed wireless access (FWA) communication system.

Through operation of an embodiment of the present invention, WLAN (wireless local area network) service is provided to a subscriber station of the fixed wireless access communication system. Mobile stations within communication range of the subscriber station, and operable in the WLAN, are able to communicate by way of the WLAN. By providing WLAN service to a plurality of subscriber stations and thereafter providing integrated control over WLAN communications, handover of communications with a mobile station is provided as the mobile station travels between coverage areas formed at separate ones of the subscriber stations.

In one aspect of the present invention, a WLAN transceiver, such as an access point, is installed at a subscriber station of a fixed wireless access communication system. A WLAN transceiver provides localized radio communications throughout a coverage area defined by the communication range of the WLAN transceiver and mobile stations with which WLAN transceiver communications. More than one WLAN transceiver is positionable at the subscriber station, as appropriate. Radio communications between a mobile station and the WLAN transceiver provide for two-way communications with the mobile station.

In another aspect of the present invention, the WLAN transceiver positioned at the subscriber station is, in turn, coupled by way of a radio link with a base station of the fixed wireless access communication system. Information originated at a mobile station is communicated by way of a local radio link to the WLAN transceiver. The WLAN transceiver, in turn, is coupled to a transceiver station, such as an IAD (integrated access device), located at the subscriber station and operable in the fixed wireless access communication system. The integrated access device, or other subscriber-station transceiver, in turn, communicates the information originated at the mobile station to the base station of the fixed wireless access system. Thereafter, the information is forwarded, as appropriate, to a destination. Analogously, information originated at, or provided to, a base station operable in the fixed wireless access communication system and which is to be terminated at the mobile station is communicated by the base station to the integrated access device, or other subscriber-station transceiver. Subsequent to reception thereat, the information is forwarded to the WLAN transceiver to be transmitted therefrom by way of the local radio link through the mobile station. Thereby, communication is effectuable between mobile station and the base station of the fixed wireless access communication system.

In another aspect of the present invention, the WLAN transceivers are installed at a plurality of subscriber stations such that the coverage areas of the separately-installed transceivers at least partially overlap. Integrated control over operation of the WLAN transceivers is provided at the network of the fixed wireless access communication system. Mobile stations which travel between coverage areas defined by different ones of the WLAN transceivers are permitted continued communication by way of local radio links by handing over communications between WLAN transceivers. Ongoing communication sessions with the mobile station continue in spite of handover of communications between the WLAN transceivers.

In another aspect of the present invention, a routing map is maintained at a location coupled to, or integrated within, the fixed wireless access communication system. The routing map maintains a listing of the location of mobile stations operable to communicate by way of local radio links with WLAN transceivers positioned at different ones of the subscriber stations of the fixed wireless access communication system. The locations at which the mobile stations are positioned are updated, as needed, as a mobile station travels between coverage areas defined by different ones of the WLAN transceivers. When information is to be communicated to a particular mobile station, the routing map is accessed to retrieve indications of the location at which the mobile station at which the information is to be terminated is positioned. Through use of the indications retrieved from the routing map, the information which is to be communicated to the mobile station is able to be most efficiently routed to the mobile station.

In another aspect of the present invention, when a handover of communications is effectuated, the routing map is updated, and information routed to the mobile by way of a WLAN transceiver from which a handover of communication is effectuated, but not yet delivered to the mobile station, is retrieved and then re-routed to the mobile station by way of the mobile station to which communications have been handed over.

In these and other aspects, therefor, apparatus, and an associated method, is provided for a fixed wireless access communication system. The fixed wireless access communication system has at least a first fixed-site base station and at least a first fixed-site subscriber station capable of communicating with the first fixed-site base station. Radio communication with a mobile station is facilitated. A first local-network radio transceiver is positioned at the at least first fixed-site subscriber station. The first local-network radio transceiver selectably transceives communication signals with the mobile station upon a first local radio link formed between the first local-network radio transceiver and the mobile station when the mobile station is positioned within a selected range of the first fixed-site subscriber station.

A more complete appreciation of the present invention and to the scope thereof can be obtained from the accompanying drawings which are briefly summarized below, the following detailed description of the presently-preferred embodiments of the invention, and the appended claims.

DETAILED DESCRIPTION OF THE INVENTION

Figure 1:
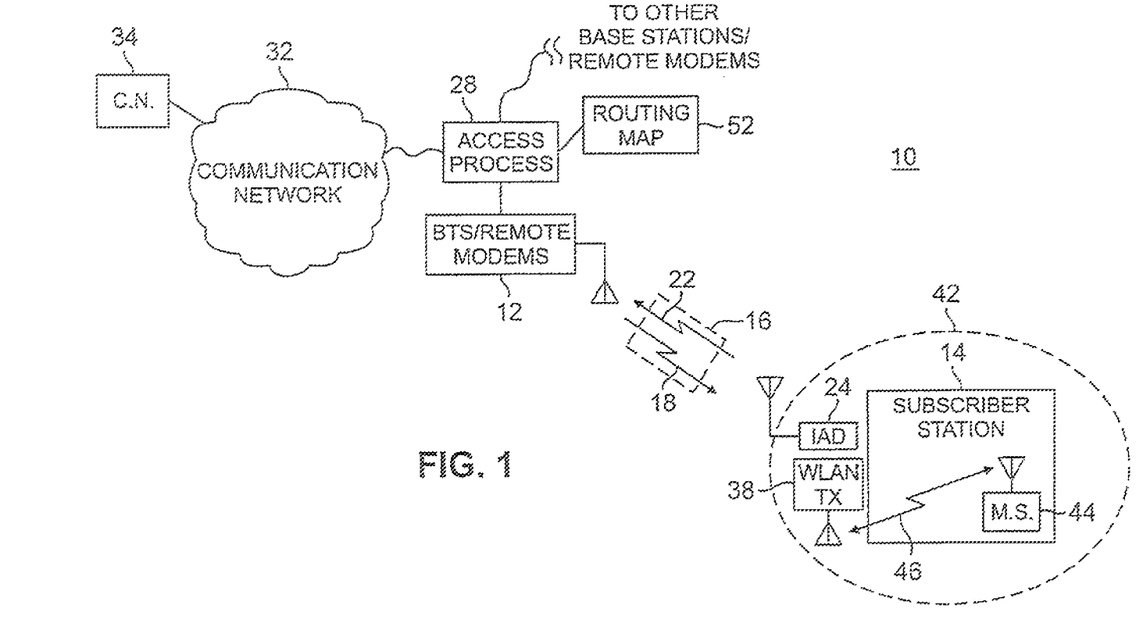
FIG. 1 illustrates a functional block diagram of a fixed wireless access (FWA) communication system in which an embodiment of the present invention is operable.

A fixed wireless access (FWA) communication system 10 provides for radio communications between fixed-site base stations, of which the base station 12 is exemplary and fixed-site subscriber stations 14 of which the subscriber station 14 is exemplary. A radio link 16 upon which forward link channels 18 and reverse link channels 22 is of a bandwidth permitting broadband communication services to be effectuated with devices located at the subscriber station 14.

In the exemplary implementation, an integrated access device (IAD) 24 forms a transceiver located at the subscriber station and at which forward link signals transmitted upon the forward link channels of the radio link are detectable and which generate reverse link signals for transmission upon the reverse link channels of the radio link. A separate IAD 24 is located at each subscriber station of the communication system.

In the exemplary implementation, each base transceiver station includes a remote modem (modulator-demodulator) capable of communicating with seven separate subscriber stations located within a radial sector. In other implementations, the circuitry of the base transceiver station is configured in other manners.

The base station 12, and the set of remote modems thereof, is coupled to an access process 28 which is operable, amongst other things, to perform control operations to control operation of the communication system. The access process 28 is, in turn, coupled to a communication network 32 such as a public-switched telephonic network or a packet data network. And, a correspondent node 34 is coupled to the communication network. A communication path is formable between the correspondent node and the IAD 24 positioned at the subscriber station by way of the communication network, the access process 28, the base station 12, and the radio link 16. Communication of information by the correspondent node to the integrated access device and from the integrated access device to the correspondent node is effectuable by way of the communication path.

Pursuant to an embodiment of the present invention, a WLAN (wireless local area network) transceiver 38 is positioned at the subscriber station 14 at the integrated access device 24 to be connected to the transceiver circuitry of the integrated access device. The WLAN transceiver defines a coverage area 42 defining a cell. A mobile station 44 positioned within the cell 42 is capable of communicating with the transceiver 38. That is to say, the radio link 46 is formable between the transceiver 38 and the mobile station 44 upon which forward and reverse link signals are communicated therebetween. Signals originated at the mobile station are communicated upon reverse link channels of the radio link 46 to the WLAN transceiver 38. And, communication signals to be terminated at the mobile station 44 are communicated upon forward link channels of the radio link 46.

Because of the connection of the WLAN transceiver to the transceiver of the integrated access device 24, signals originated at the mobile station and communicated to the WLAN transceiver can, in turn, be provided to the transceiver of the integrated access device to be communicated upon reverse link channels of the radio link 16 and, thereafter, be communicated to another device, such as the correspondent node 34. Analogously, signals originated at the correspondent node, or elsewhere, can be communicated to the mobile station by way of forward link channels of the radio links 16 and 46 to the mobile station. Thereby communications are effectuable with a mobile station in the fixed wireless access communication system.

In the exemplary implementation, the integrated access device 24 forms a rack-assembly having expansion slots to receive expansion cards thereat. And, the WLAN transceiver is mounted upon, or is otherwise formed at, an expansion card connectable to the expansion slot of the rack-assembly. Thereby the integrated access device together with the WLAN transceiver form an integrated device providing for two-way communication upon the radio link 16 as well as two-way communication upon the radio link 46.

Figure 2:
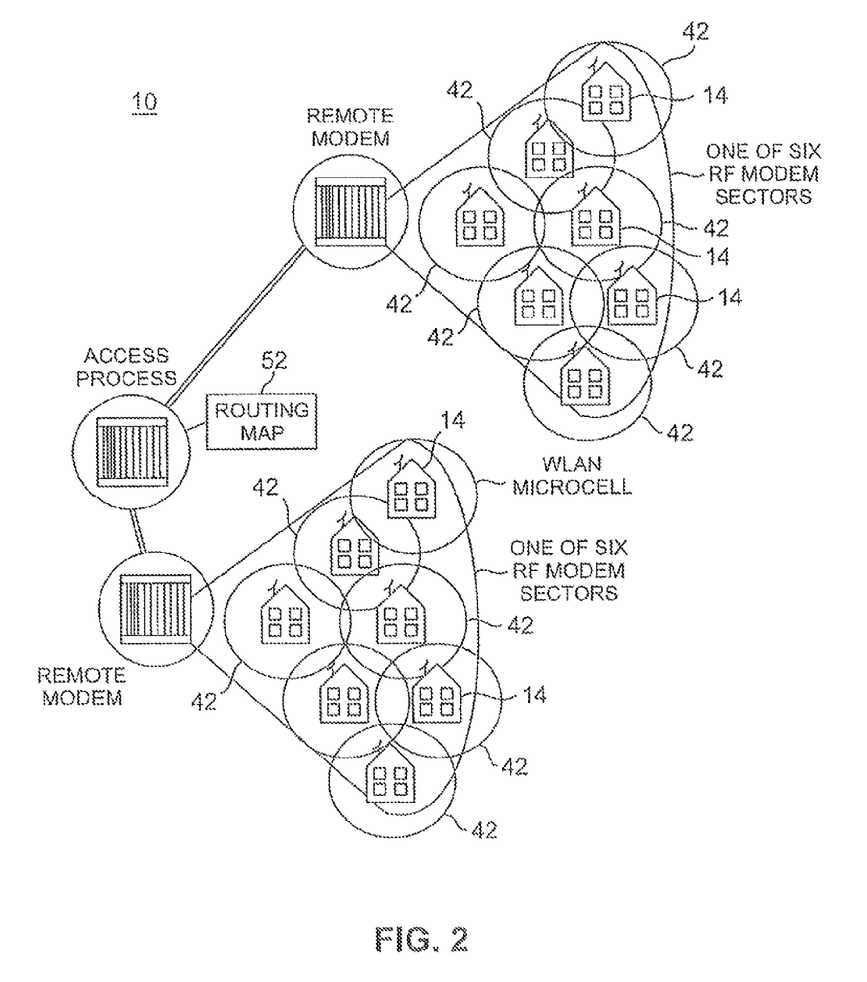
FIG. 2 illustrates a representation of a fixed wireless access communication system similar to that shown in FIG. 1 here also illustrating a plurality of cellular coverage areas defined by about a plurality of subscriber stations of the fixed wireless access communication system.

FIG. 2 illustrates another view of the communication system 10, here illustrating an implementation in which a plurality of subscriber stations 14 include WLAN transceivers 36 (shown in FIG. 1) connected to corresponding integrated access devices 24 (also shown in FIG. 1). The coverage areas 42 defined by respective ones of the WLAN transceivers are shown in the figure. Adjacent ones of the coverage areas over lap with one another. The remote modes of the base transceivers are again shown in the Figure as is the access process. An arrangement in which the remote modems communicate with subscriber stations positioned within a radio sector is shown in the figure. In other implementations, other arrangements are utilized.

A mobile station initially positioned within, or approximate to, a coverage area 42 defined by a WLAN transceiver positioned at a first subscriber station is permitted movement, such as out of the coverage area defined by the transceiver positioned at a first subscriber station and into the coverage area defined by a WLAN transceiver of another subscriber station. Through operation of an embodiment of the present invention, a handover of communications is effectuated from the first WLAN transceiver to another WLAN transceiver, thereby to permit continued communications with the mobile station.

Determination of when to initiate handover of communications is made responsive to measurements of signal characteristics of communication signals communicated between the WLAN transceiver and the mobile station. In one implementation signal characteristics are measured, or otherwise determined, at the mobile station and results of such measures or determinations of are reported back to the WLAN transceiver and appropriate control circuitry. Thereafter, if appropriate, the handover of communications is effectuated.

A routing map 52 is further shown in the figure. The routing map is functionally connected to the access process 28. The routing map includes a listing of the mobile stations, such as the mobile station 46 operable to transceive communication signals pursuant to the WLAN service. Indexed together with the listing the mobile stations are the locations at which the mobile stations are positioned. When communications are to be effectuated with a particular mobile station, such as communications originated by the correspondent node 34, the routing map is accessed and the communication signals are routed to the mobile stations at the position indicated in the routing map. And, when a handover is effectuated, information routed to a mobile station but not yet delivered is rerouted to the WLAN transceiver to which communications have been handed over.

FIG. 3 again illustrates the communication system 10, here showing a plurality of base stations 12 and subscriber stations 14 associated with various ones of the base stations. Each of the subscriber stations includes a WLAN transceiver (shown in FIG. 1) various of the base transceiver stations are here shown also to be coupled by way of the communication network 32, again either a PSTN, a packet data network, or a combination of such networks. Movement of a mobile station between the coverage areas is defined by different ones of the subscriber stations are shown in the figure. For instance, movement of a mobile station indicated by the arrow 56 represents movement of the mobile station between subscriber stations associated with separate cells of separate base stations. Such movement results in access process routing of subsequent communication signals to a new cell of the fixed wireless access communication system, access process routing to a separate remote mode sector, and remote modem routing to a new subscriber integrated access device. The arrow 58 is representative of movement of a mobile station within a single sector of a single base station. Here, the result is a subscriber integrated access device to a remote modem routing change.

Figure 3:
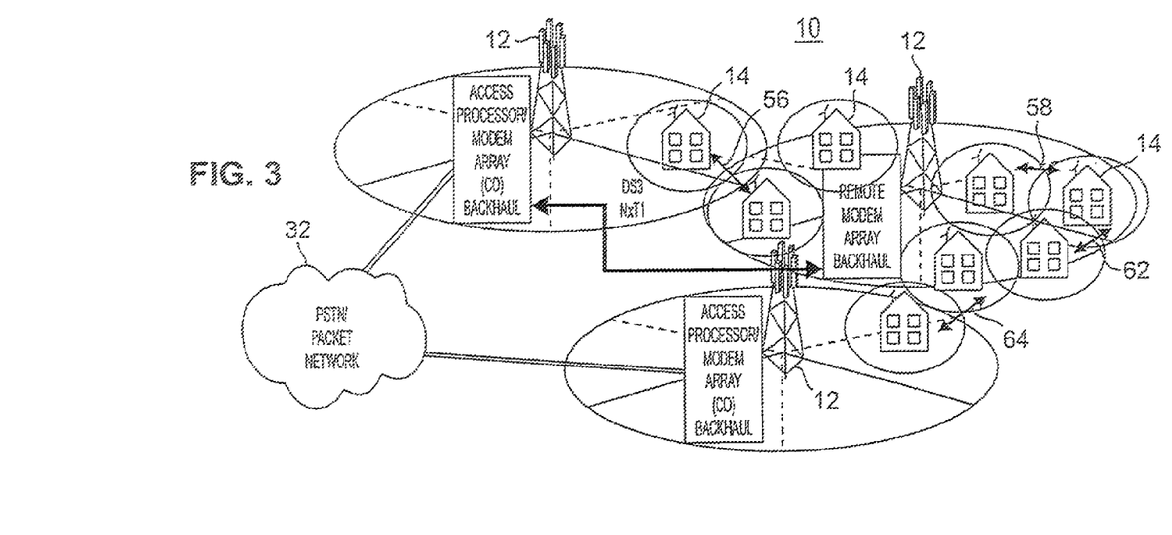
FIG. 3 illustrates another representation of the fixed wireless access communication system shown in FIGS. 1 and 2.

The arrow 62 is representative of movement of a mobile station between adjacent sectors defined by a single base station. Such movement results in access process routing of the communication signal to the new remote modem sector transceiver. And, the arrow 64 is representative of movement of a mobile station between sectors of different cells defined by two different base stations. Such movement results in access process to access process routing resolution, access processing routing to the new cell, access process routing to the new remote modem sector, and remote modem routing to the new subscriber access integrated device. Thereby, handovers of communications are effectuable through any movement of a mobile station between coverage areas defined by WLAN transceivers forming a portion of a fixed wireless access communication system.

Figure 4:
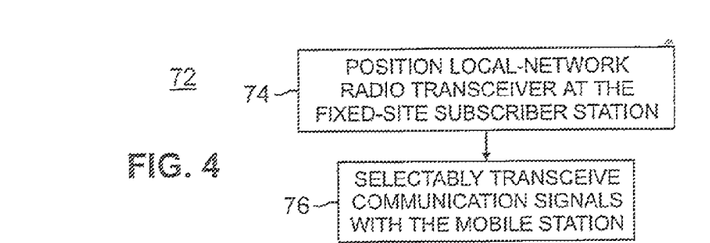
FIG. 4 illustrates a method flow diagram listing the method of operation of the method of an embodiment of the present invention.

FIG. 4 illustrates a method, shown generally at 72 of an embodiment of the present invention. The method facilitates radio communications with the mobile station in a fixed wireless access communication system having at least a first base station and at least a first subscriber station capable of communicating with the base station. First, and as indicated by the block 74, a local-network radio transceiver is positioned at the fixed-site subscriber station. Then, and as indicated by the block 76, communication signals are selectably transceived with the mobile station upon a first local radio link between the local-network radio transceiver and a mobile station when the mobile station is positioned within a coverage area defined by the local-network radio transceiver.

Through operation of the method of an embodiment of the present invention, WLAN service is provided in a fixed wireless access in a communication system. A mobile station operable in a wireless local area network is thereby able to communicate in the WLAN coverage area encompassing the subscriber station at which the local-network radio transceiver is positioned.

The previous descriptions are of preferred examples for implementing the invention, and the scope of the invention should not necessarily be limited by this description. The scope of the present invention is defined by the following claims.

What is claimed is:

1. A wireless communication device, comprising:
a first wireless transceiver operable to communicate with a base station, wherein the base station communicates with the first wireless transceiver and a plurality of other wireless communication devices according to a wide area wireless communication protocol; and
a second wireless transceiver coupled to the first wireless transceiver and operable to directly communicate with a first mobile station and a second mobile station, wherein the second wireless transceiver communicates with the first mobile station and the second mobile station according to a local area wireless communication protocol,
wherein the first wireless transceiver receives from the base station a first downlink signal intended for the first mobile station and provides the first downlink signal to the second wireless transceiver and wherein the second wireless transceiver receives the first downlink signal and re-transmits the first downlink signal to the first mobile station as a second downlink signal according to the local area wireless communication protocol, and
wherein the second transceiver monitors first signal characteristics of the second downlink signal of the first mobile station and monitors second signal characteristics of the second mobile station, and based on the first signal characteristics and the second characteristics, routes information to the first mobile station and the second mobile station, respectively.

2. The wireless communication device of claim 1, wherein the second wireless transceiver is coupled to the first wireless transceiver by a wireline connection.

3. The wireless communication device of claim 2, wherein the second wireless transceiver is removably coupled to the first wireless transceiver.

4. The wireless communication device of claim 1, wherein the first wireless transceiver and second wireless transceiver are disposed in a fixed site subscriber station.

5. The wireless communication device of claim 1, wherein the first wireless transceiver and the second wireless transceiver are part of an integrated device.

6. A method for communicating with a wireless communication device, comprising:
a first wireless transceiver operable to communicate with a base station, wherein the base station communicates with the first wireless transceiver and a plurality of other wireless communication devices according to a wide area wireless communication protocol; and
a second wireless transceiver coupled to the first wireless transceiver and operable to directly communicate with a first mobile station and a second mobile station, wherein the second wireless transceiver communicates with the first mobile station and the second mobile station according to a local area wireless communication protocol, the method comprising:

receiving, using the first wireless transceiver from the base station, a first downlink signal intended for the first mobile station;

providing, using the first wireless transceiver, the first downlink signal to the second wireless transceiver;

receiving, using the second wireless transceiver, the first downlink signal and re-transmitting the first downlink signal to the first mobile station as a second downlink signal according to the local area wireless communication protocol;

monitoring, using the second transceiver, first signal characteristics of the second downlink signal of the first mobile station;

monitoring, using the second transceiver, second signal characteristics of the second mobile station; and based on the first signal characteristics and the second characteristics, routing, using the second transceiver, information to the first mobile station and the second mobile station, respectively.

* * * * *